US007480061B2

(12) United States Patent
Lee et al.

(10) Patent No.: US 7,480,061 B2
(45) Date of Patent: Jan. 20, 2009

(54) 3D SHAPE MEASUREMENT APPARATUS AND METHOD USING STEREO MOIRÉ TECHNIQUE

(75) Inventors: Hyun Ki Lee, Daejeon (KR); Hyung Suck Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 11/998,175

(22) Filed: Nov. 27, 2007

(65) Prior Publication Data

US 2008/0239288 A1 Oct. 2, 2008

(30) Foreign Application Priority Data

Apr. 2, 2007 (KR) ...................... 10-2007-0032164

(51) Int. Cl.
*G01B 11/24* (2006.01)

(52) U.S. Cl. ...................................... 356/603; 356/605

(58) Field of Classification Search ......... 356/601–611, 356/521; 250/237 R, 237 G; 359/619
See application file for complete search history.

(56) References Cited

U.S. PATENT DOCUMENTS 6,438,272 B1 * 8/2002 Huang et al. ................ 382/286

2007/0211258 A1 * 9/2007 Lee et al. ..................... 356/605

OTHER PUBLICATIONS

Applied Optics, vol. 46, No. 17 (Jun. 10, 2007) by Rui Ishiyama et al.; Absolute Phase Measurements Using Geometric Constraints Between Multipe Cameras and Projectors.
International Journal of Optomechatronics, 1: 209-230, 2007 by Hyunki Lee et al.; Stereo Moire Technique: A Novel 3-D Measurement Method Using A Stereo Camera and A Digital Pattern Projector.

* cited by examiner

*Primary Examiner*—Gregory J Toatley, Jr.
*Assistant Examiner*—Tri T Ton
(74) *Attorney, Agent, or Firm*—Graybeal Jackson LLP

(57) ABSTRACT

Disclosed herein is a 3D shape measurement method and apparatus using a stereo moiré technique. The 3D shape measurement method measures the 3D shape of an object to be measured using a digital pattern projector and first and second cameras. The method includes a first step of projecting a phase-shifted fringe pattern onto the object to be measured using the digital pattern projector, a second step of acquiring four fringe images using each of the first and second cameras, and then acquiring two pieces of phase information using a moiré technique, and a third step of acquiring a pair of corresponding points, which satisfy stereo phase conditions for making all $2\pi$ ambiguity constants as integers, using the two pieces of phase information and then measuring the 3D shape of the object using the corresponding points.

5 Claims, 22 Drawing Sheets

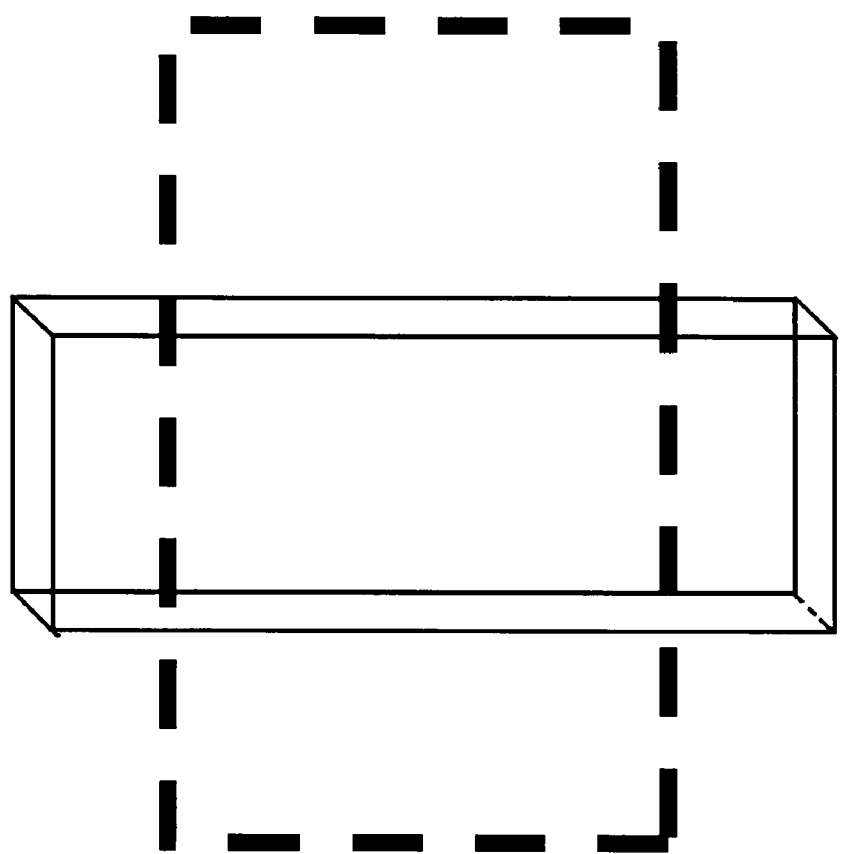

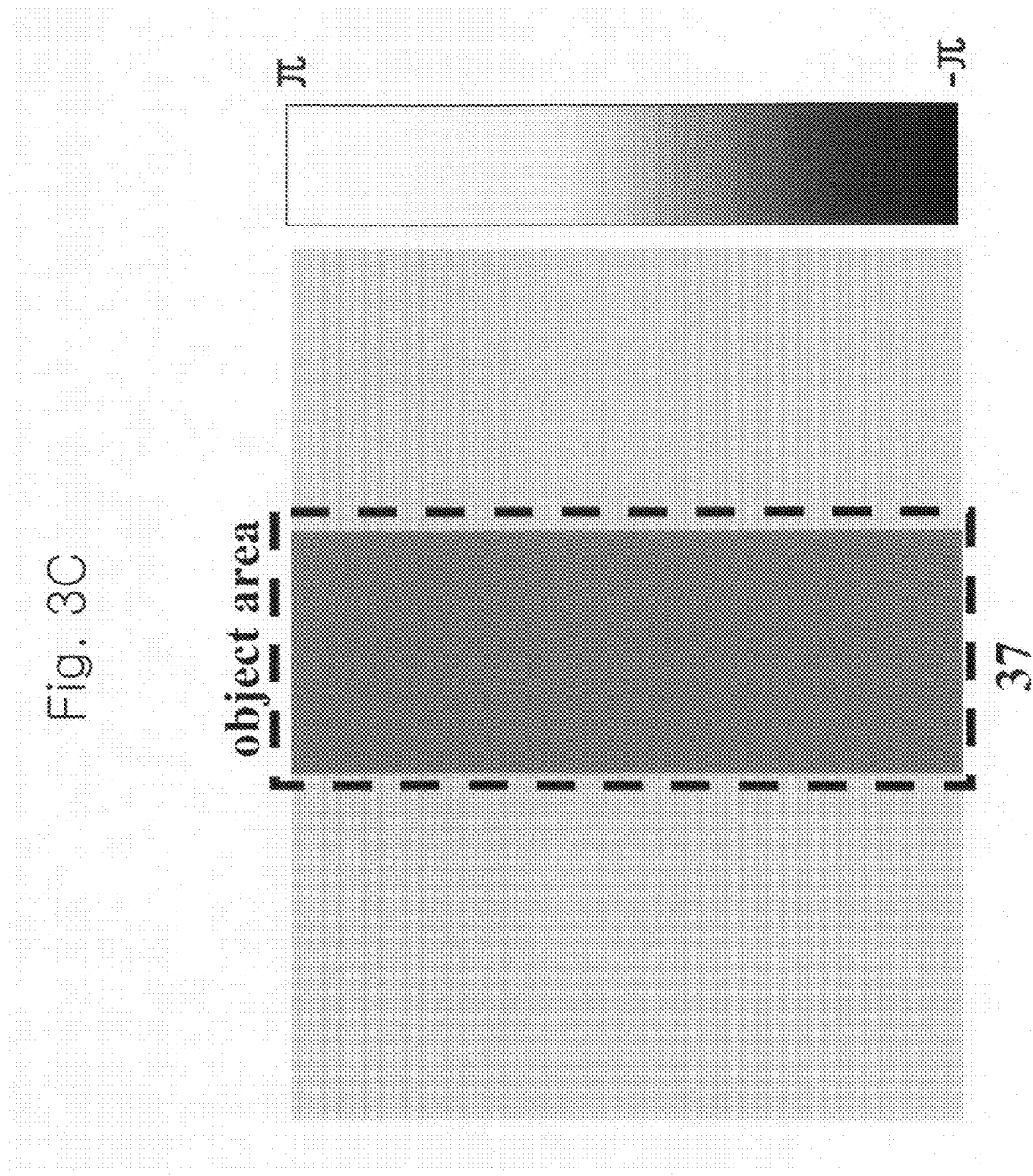

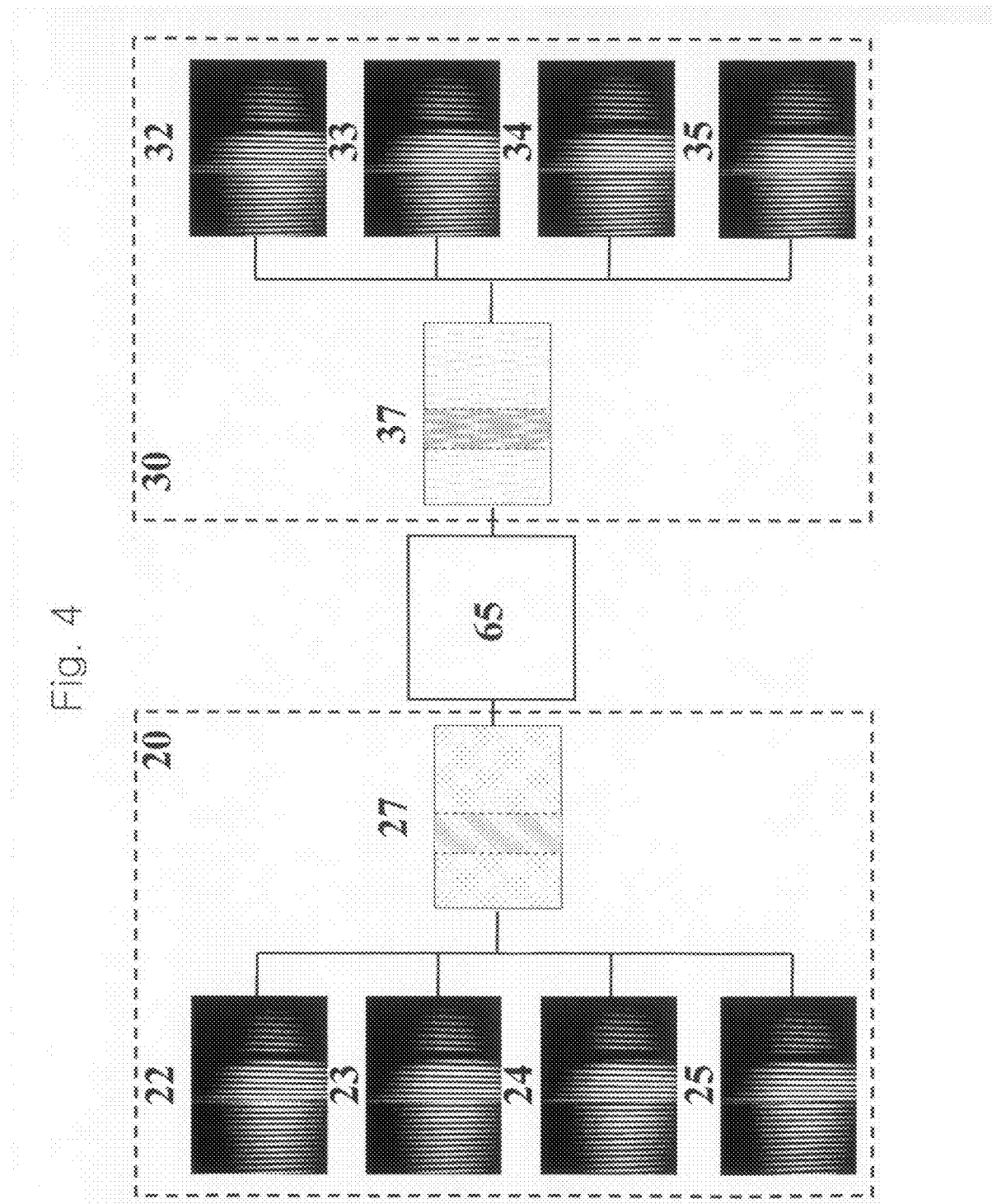

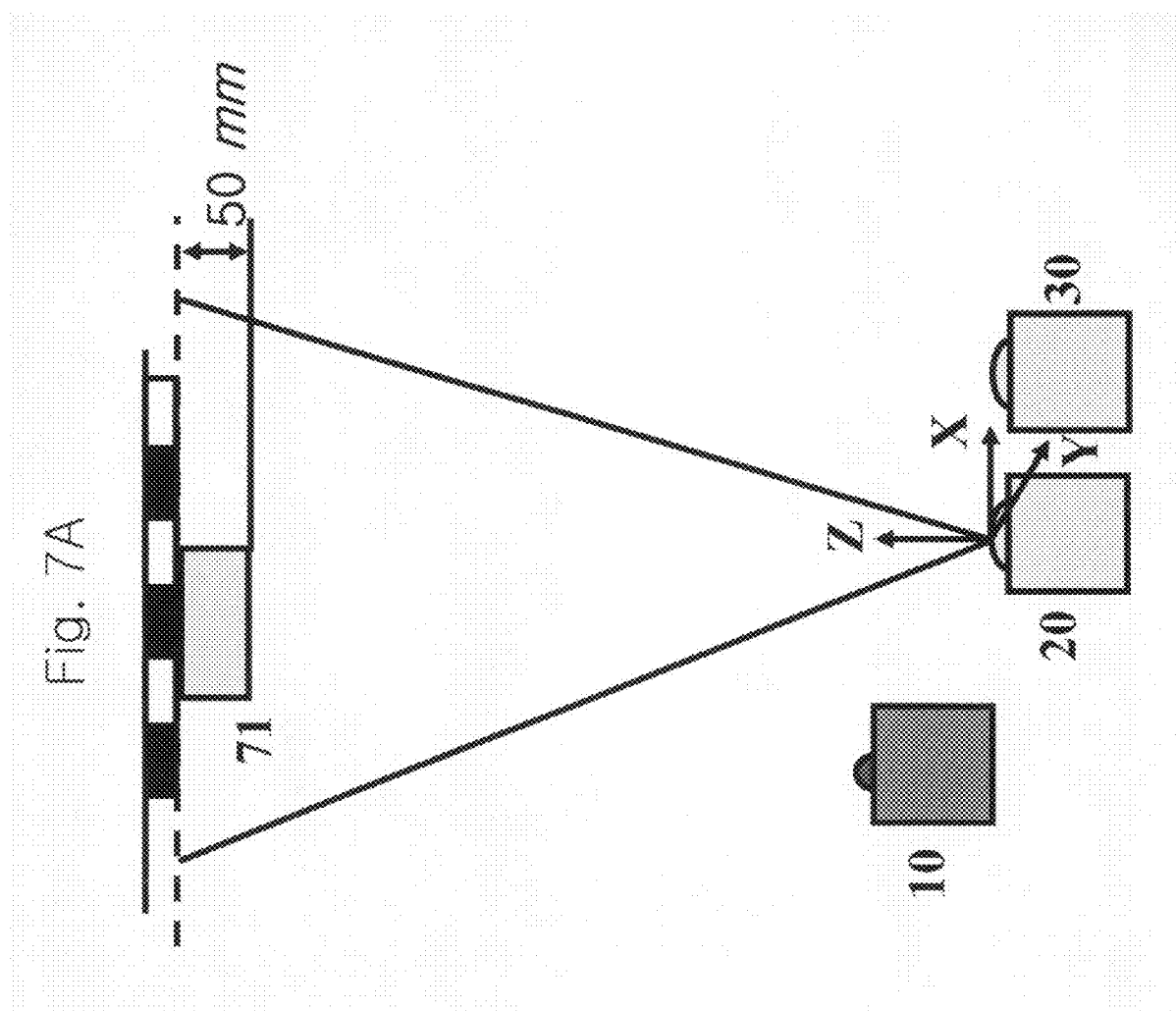

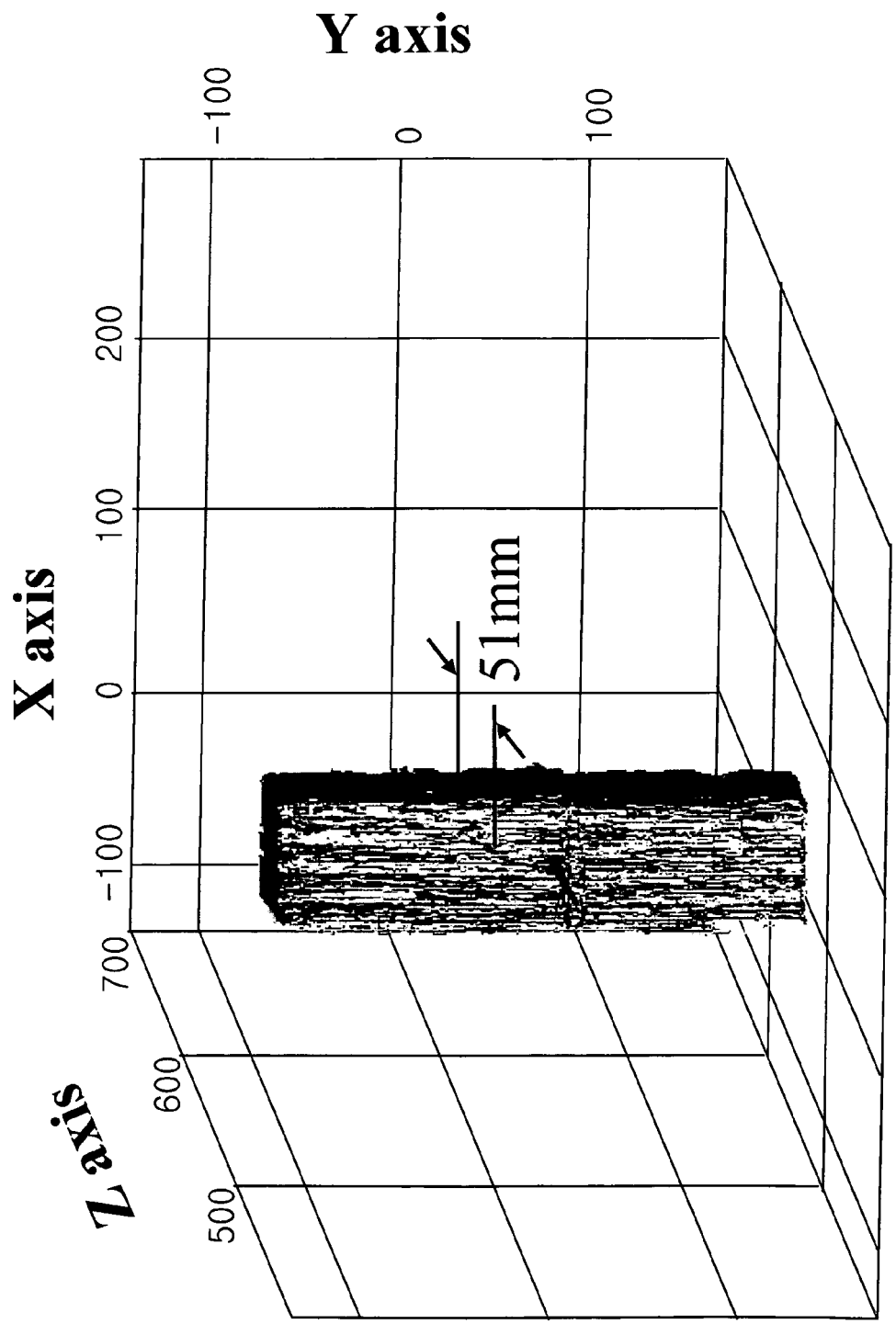

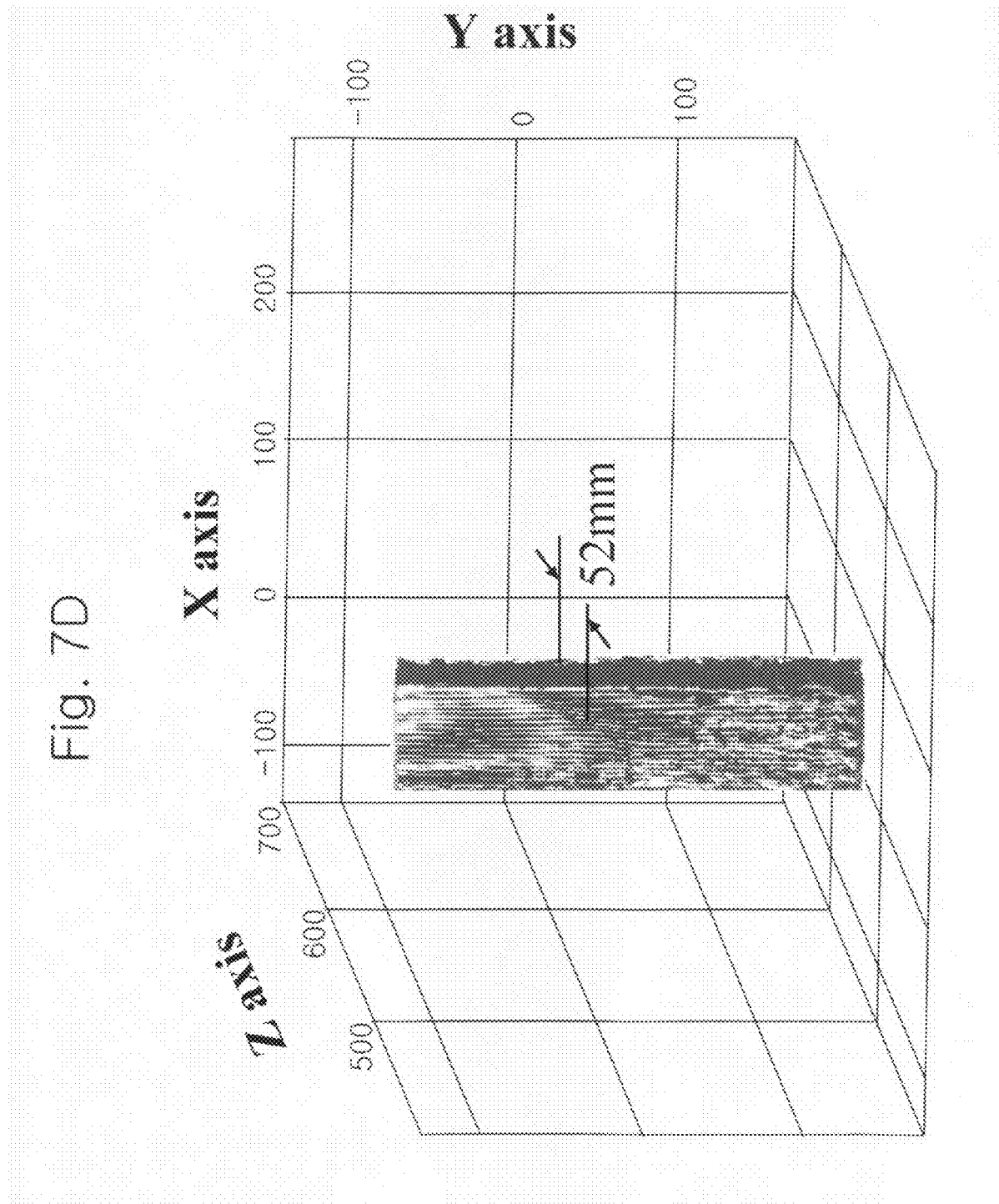

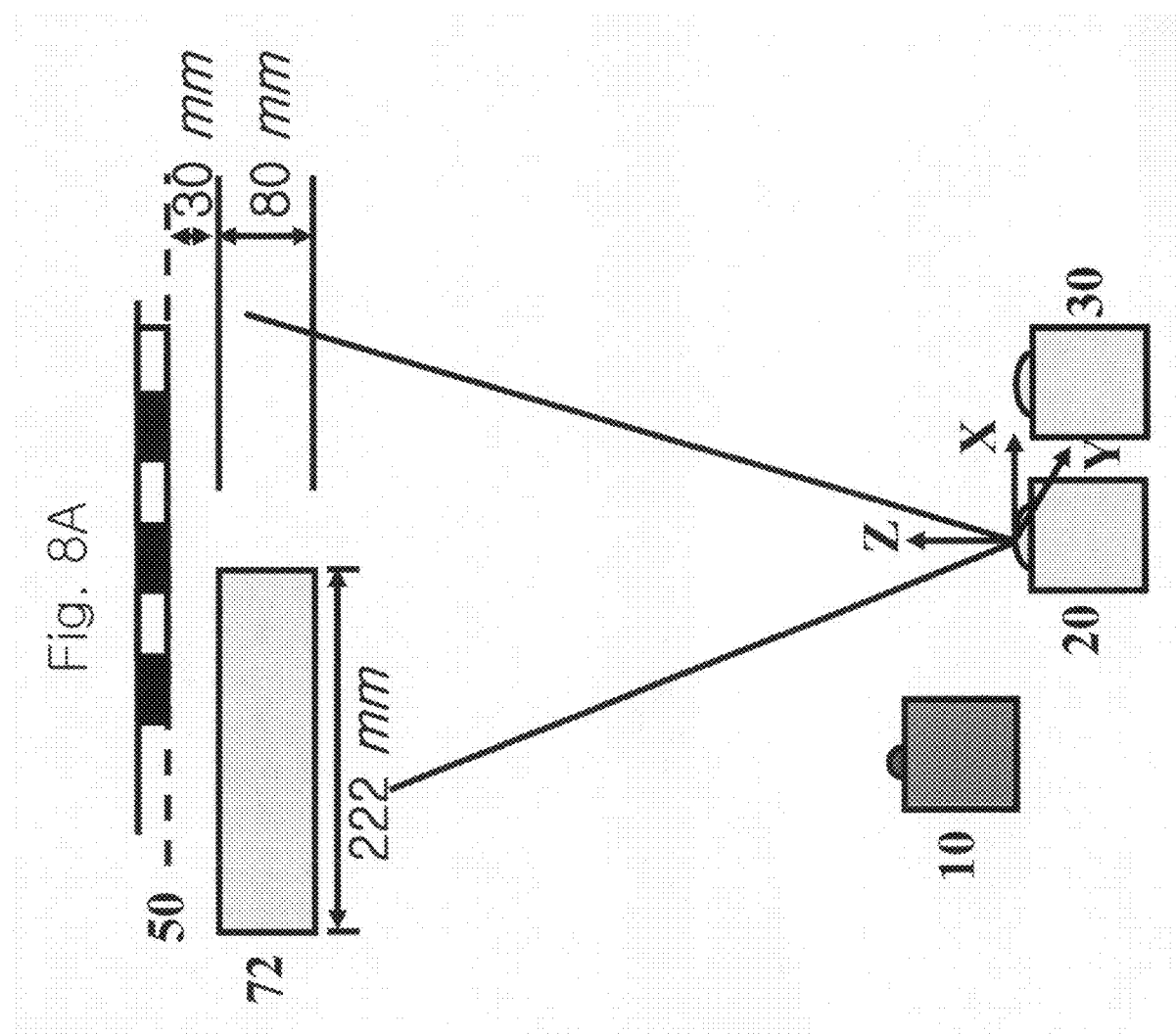

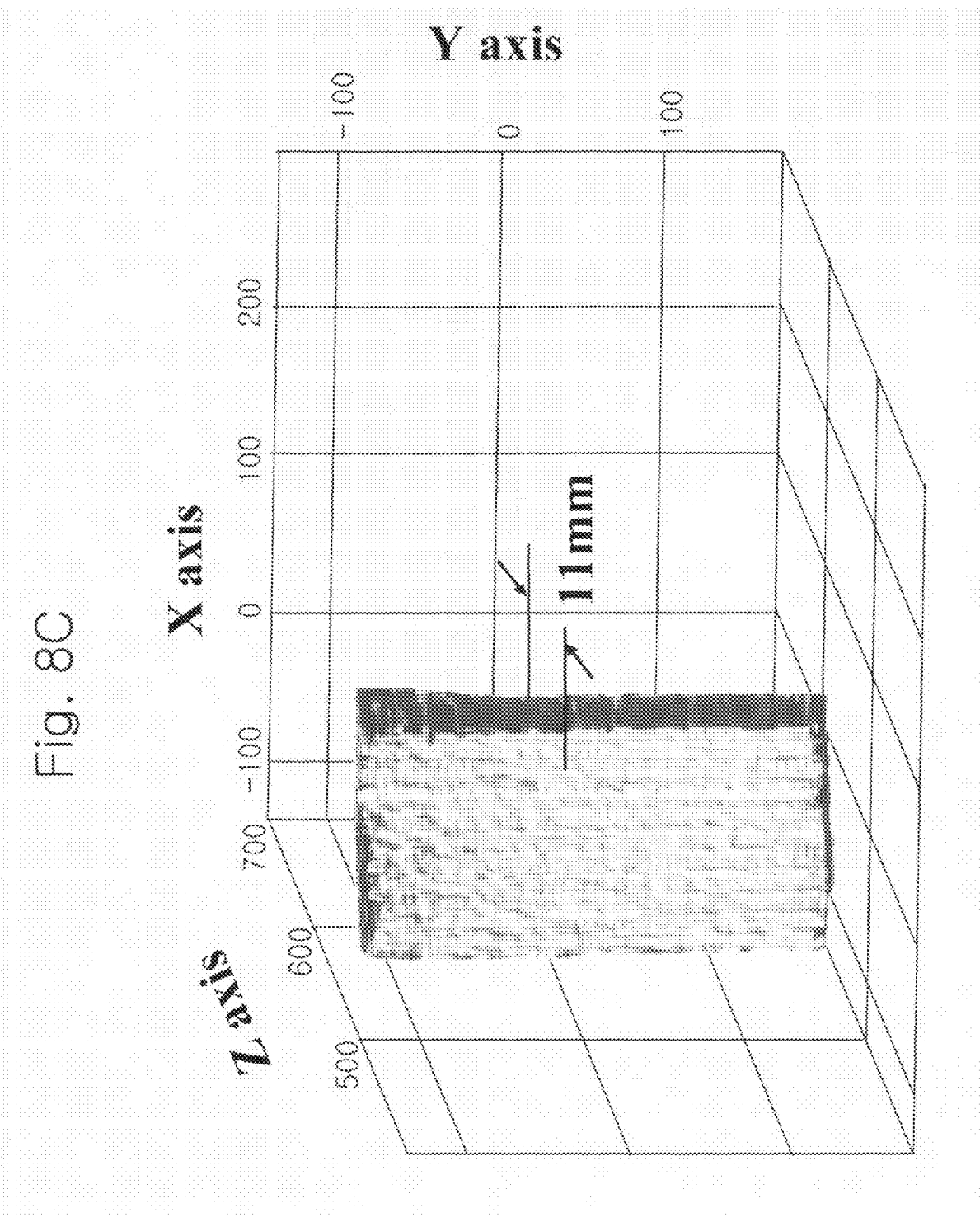

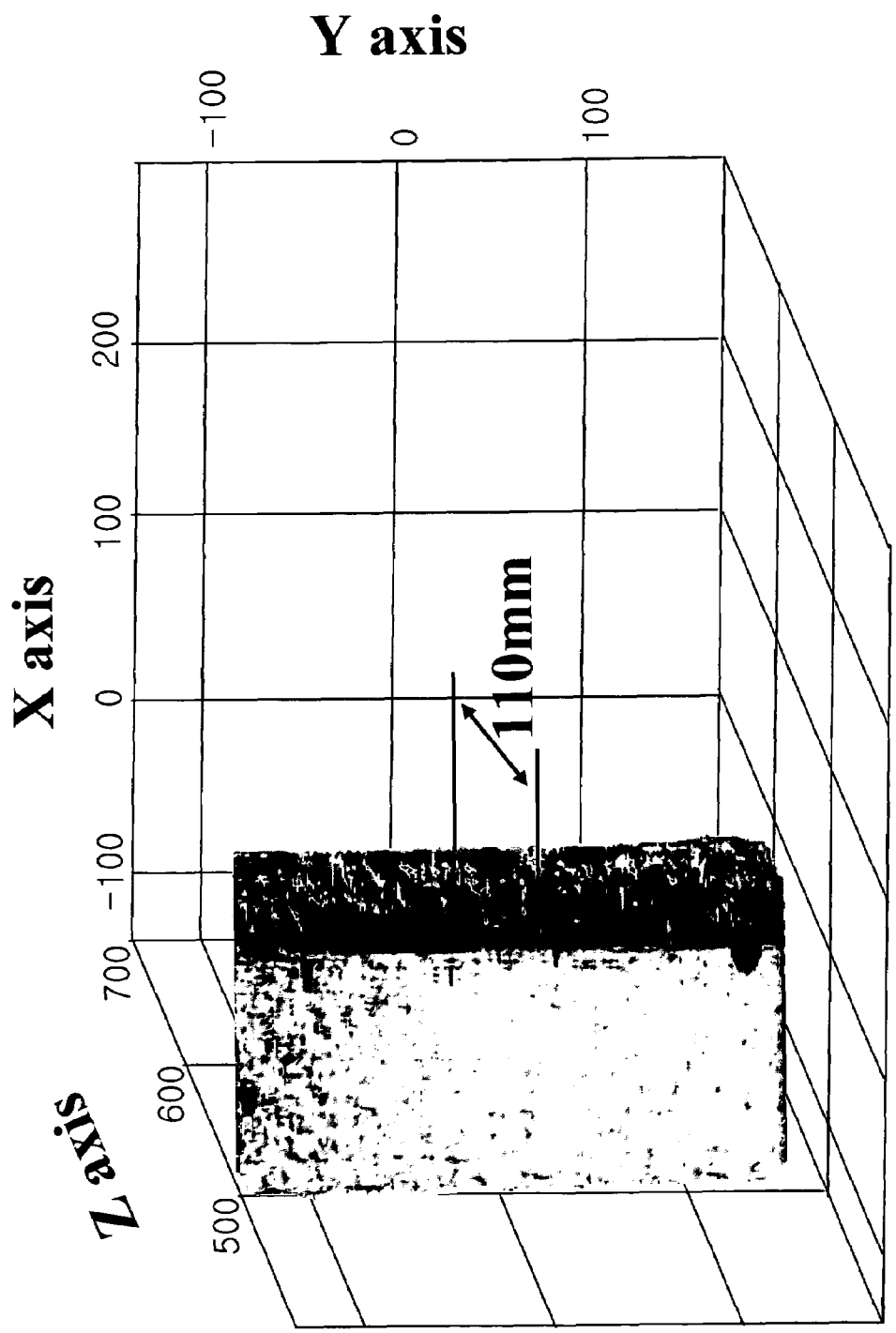

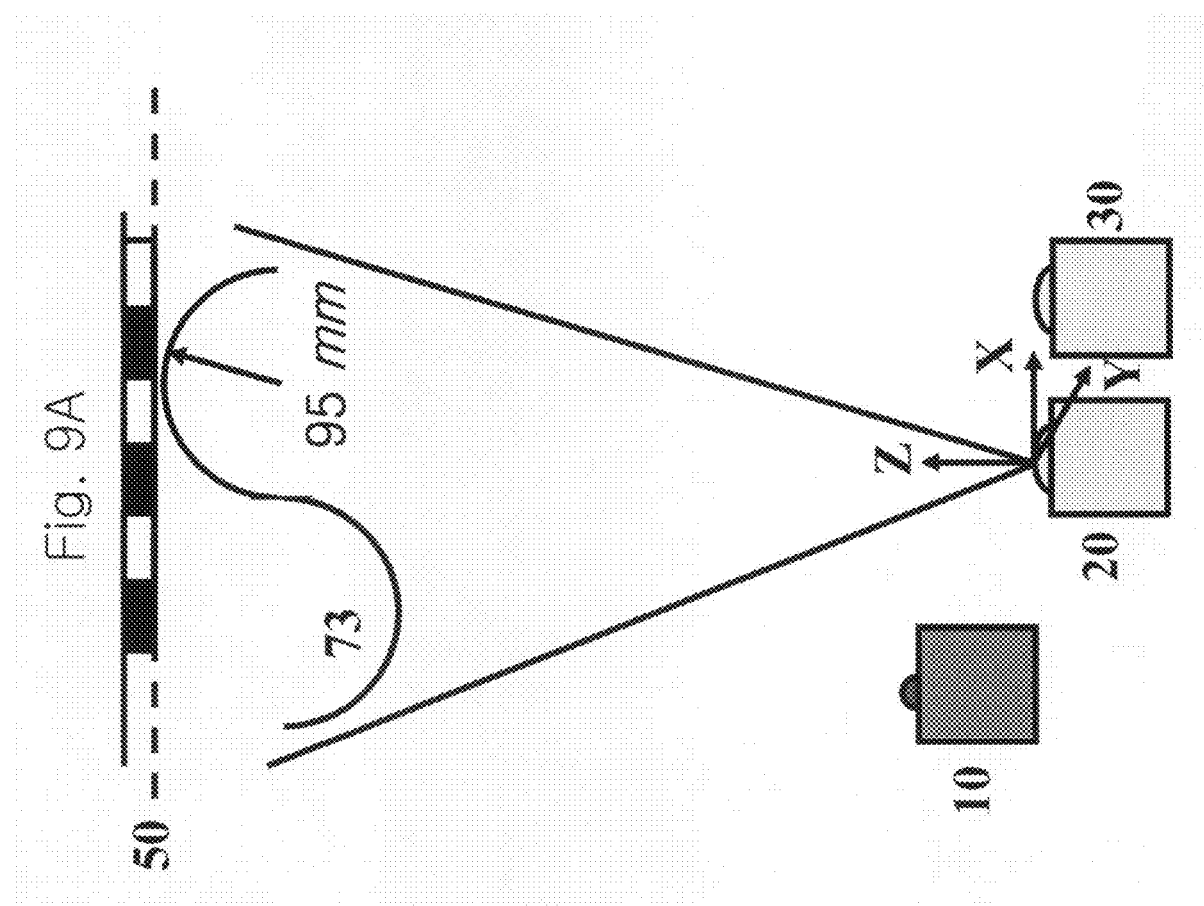

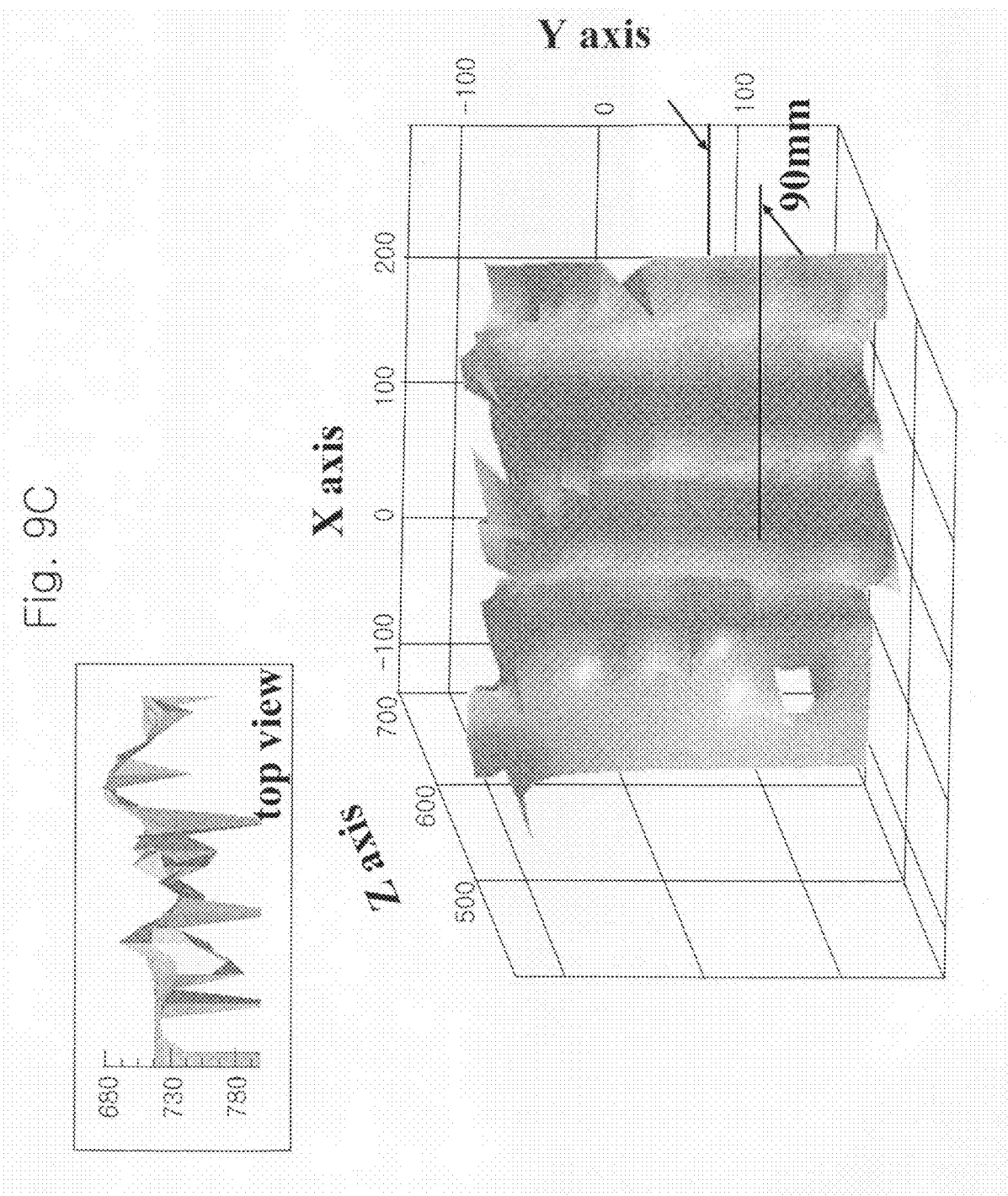

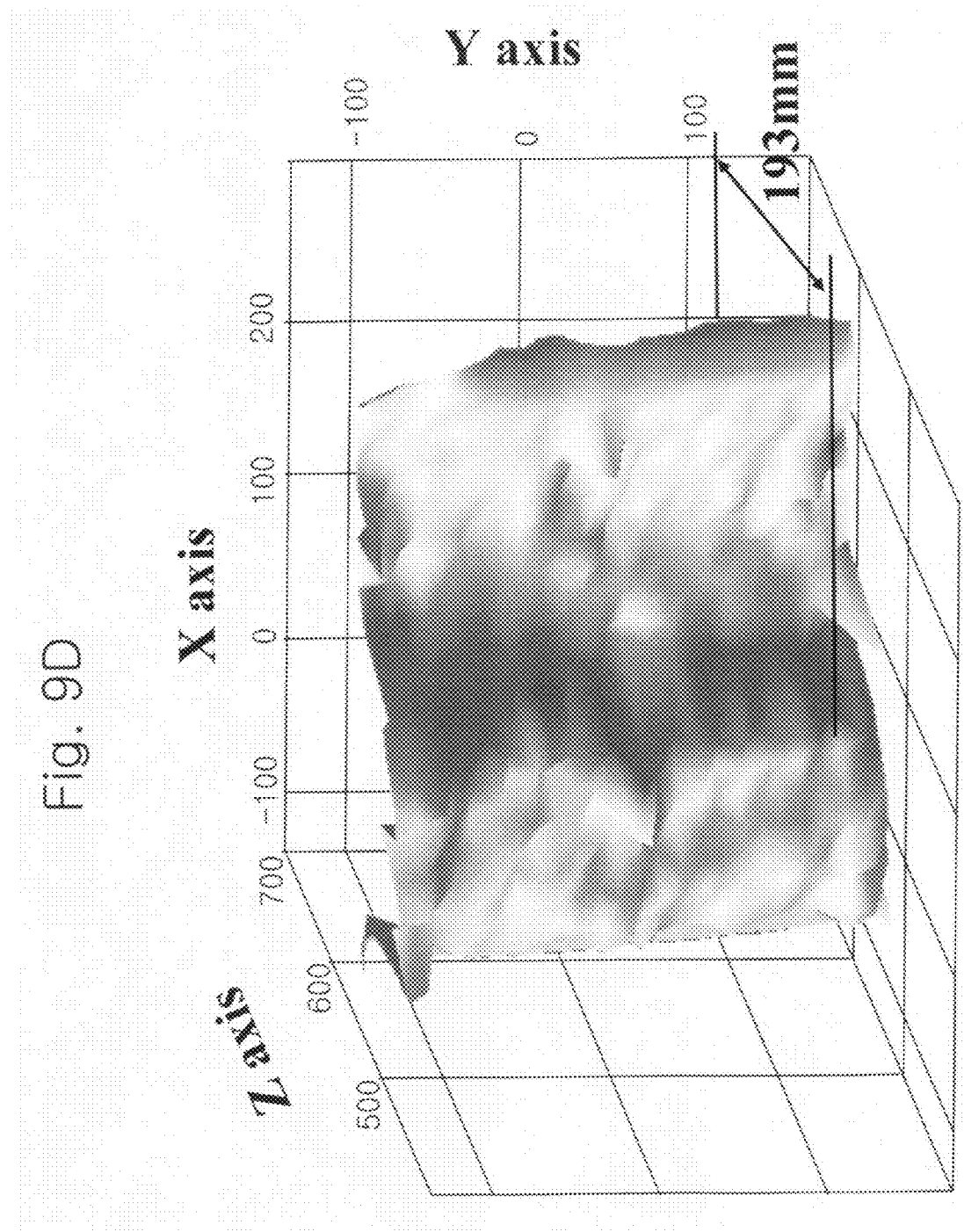

3D SHAPE MEASUREMENT APPARATUS AND METHOD USING STEREO MOIRÉ TECHNIQUE

PRIORITY CLAIM

This application claims priority from Korean Patent Application No. 2007-0032164, filed 2 Apr. 2007, which is incorporated herein by reference.

BACKGROUND

1. Field of the Invention

The present invention relates generally to a three-dimensional (3D) shape measurement apparatus and method using the stereo moiré technique, and, more particularly, to a 3D shape measurement apparatus and method using the stereo moiré technique, in which a stereo vision technique using two cameras is combined with existing Phase Measuring Profilometry (PMP) technique and a novel stereo phase analysis method is applied, thereby solving the $2\pi$ ambiguity problem of typical moiré technique.

2. Description of the Related Art

With regard to 3D shape measurement technology, optical trigonometry using a laser structured light, a measurement method using a stereo vision technique, and a measurement method using the moiré principle have been developed and used. Among these methods, a 3D shape measurement method using the moiré principle has been widely used, and, more particularly, PMP has been more popularly used. Since these measurement methods are based on optical methods, they can be used for fast and accurately acquiring 3D shapes of object.

However, the 3D shape measurement method using typical moiré technique has inherent limitation: $2\pi$ ambiguity that makes impossible to find a correct object's shape measurement. If object has the height over than $2\pi$, which is determined by the period of a periodic pattern projected by pattern projector, PMP technique cannot measure correct object shape. Accordingly, many methods for solving this $2\pi$ ambiguity problem have been conducted such as unwrapping method and phase shifting method. However, these methods based on typical moiré technique still have the problem of causing inaccurate results, because it is difficult to determine whether a measurement result value is related to $2\pi$ ambiguity or is related to objects' shape to be measured, having a depth equal to or greater than $2\pi$, in the case where two objects to be measured are spaced apart from each other by a distance equal to or greater than $2\pi$. That is, since typical moiré technique has the $2\pi$ ambiguity problem, it is possible to acquire relative 3D shape information of object, but it is impossible to acquire accurate 3D information. Accordingly, in the past, there were attempts to overcome the $2\pi$ ambiguity problem.

Of these attempts, Korean Unexamined Patent Publication No. 2005-0031328 disclosed "3D Inspection Method and Apparatus using Stereo Vision and Moiré." This disclosed technology is configured such that, when an optical projection unit projects a uniform pattern a plurality of times and an object to be measured is phase-shifted using an actuator, the object to be measured is measured using two cameras at every time point, and the 3D shape information of the object to be measured is finally measured by comparing a plurality of pieces of 3D shape information, measured as described above, with each other. However, this technology could not completely overcome the $2\pi$ ambiguity problem either. That is, $2\pi$ ambiguity occurs at locations corresponding to multiples of right and left phase information. Furthermore, this technology could not overcome the problem of finding corresponding points.

Furthermore, research that attempted to measure a 3D shape using a pattern projector and two cameras was conducted (refer to "An active trinocular vision system of sensing indoor navigation environment for mobile robots," authored by M. Y. Kim and H. S. Cho, and published in Sensors & Actuators: A. Physical, Vol. 125, No. 2, pp. 192-209, in 2006). This technology is configured such that a virtual pattern image is created with the pattern projector regarded as one virtual camera, and a 3D coordinate system is acquired using this image and the two remaining images captured from two cameras. In more detail, the 3D coordinate system is acquired through line matching between two captured images. However, this technology has problems in that the $2\pi$ ambiguity problem cannot be completely removed because it uses line matching. In addition, a long operating time is required for line blobbing.

SUMMARY

Accordingly, the present invention has been made keeping in mind the above problems occurring in the prior art, and an object of the present invention is to provide a 3D shape measurement apparatus and method using the stereo moiré technique, in which a stereo vision technique using two cameras is combined with typical PMP technique, and a novel stereo phase analysis method is applied, thereby solving the $2\pi$ ambiguity problem of the moiré technique.

In order to accomplish the above object, the present invention provides a 3D shape measurement method using a stereo moiré technique, the method measuring the 3D shape of an object to be measured by using a digital pattern projector and first and second cameras. The method includes a first step of projecting a phase-shifted periodic pattern onto the object to be measured using the digital pattern projector; a second step of acquiring four periodic pattern images using each of the first and second cameras, and then acquiring two pieces of phase information by adopting typical moiré technique; and a third step of acquiring a pair of corresponding points, which satisfy stereo phase conditions which make all $2\pi$ ambiguity constants as integer, using two pieces of phase information and then measuring the 3D shape of the object.

At the first step, the digital pattern projector projects the periodic pattern onto the object to be measured, where a location and projection angle has been calibrated.

The second step includes the step of selecting candidate points having $2\pi$ ambiguity using the phase information acquired through the second camera; and projecting the candidate points onto the phase information plane of the first camera. The third step is selecting a point, which satisfies stereo phase conditions for making all $2\pi$ ambiguity constants as integers.

Additionally, the present invention provides a 3D shape measurement apparatus using a stereo moiré technique, the apparatus comprising a digital pattern projector for projecting the periodic pattern, first and second cameras for detecting a periodic pattern produced by the digital pattern projector, and a control unit for controlling operation of the digital pattern projector and first and second cameras, wherein the control unit is configured such that four fringe images are acquired through each of first and second cameras, two pieces of phase information are acquired using typical moiré technique, a pair of corresponding points, which satisfy stereo phase conditions for making all $2\pi$ ambiguity constants as integers, is acquired using the two pieces of phase information, and a 3D shape of the object is measured.

The digital pattern projector projects the periodic pattern, a location and angle of which has been calibrated, onto the object to be measured.

BRIEF DESCRIPTION OF THE DRAWINGS

The above and other objects, features and other advantages of the present invention will be more clearly understood from the following detailed description taken in conjunction with the accompanying drawings, in which:

FIGS. 3A, 3B and 3C are drawings showing the states in which a PMP technique according to the present invention is applied;

FIG. 4 is a conceptual diagram of a stereo moiré technique according to the present invention;

DESCRIPTION OF THE PREFERRED EMBODIMENTS

Figure 1:
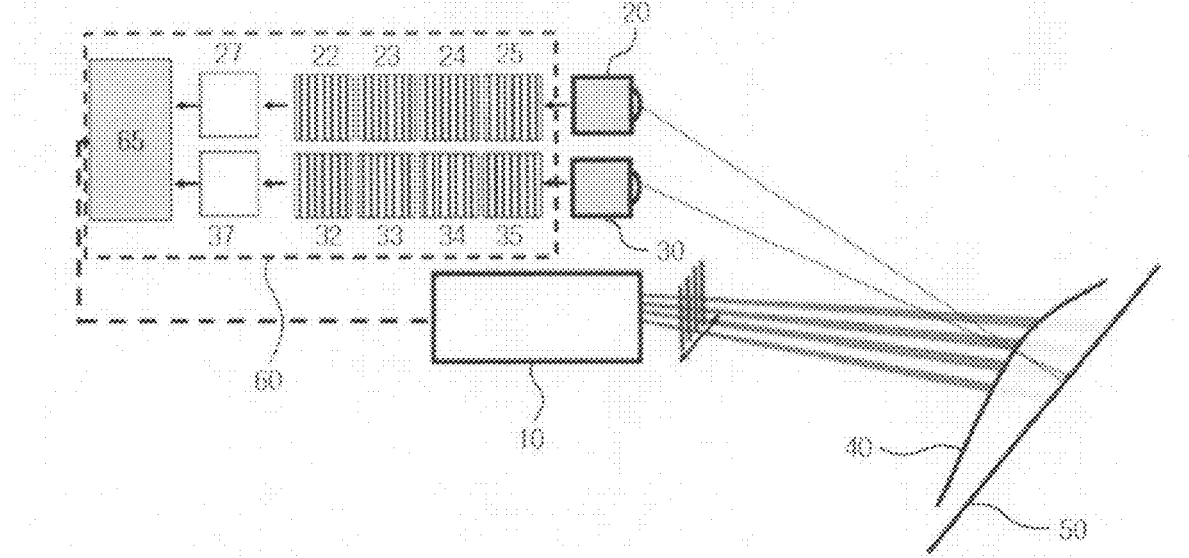
FIG. 1 is a conceptual diagram of a 3D shape measurement apparatus using the stereo moiré technique according to an embodiment of the present invention.

Reference now should be made to the drawings, in which the same reference numerals are used throughout the different drawings to designate the same or similar components.

Preferred embodiments of a 3D shape measurement apparatus and method using the stereo moiré technique according to the present invention will be described in detail with reference to the accompanying drawings below.

FIG. 1 is a conceptual diagram of a 3D shape measurement apparatus using the stereo moiré technique according to an embodiment of the present invention. As shown in FIG. 1, the 3D shape measurement apparatus using the stereo moiré technique according to the embodiment includes a digital pattern projector 10 for projecting periodic pattern onto the surface of an object 40 to be measured while freely controlling a pattern period, first and second cameras 20 and 30 for detecting a periodic pattern produced by the digital pattern projector 10, and a control unit 60 for analyzing images, detected by first and second cameras 20 and 30 respectively, by comparing them with each other while controlling the operation of the digital pattern projector 10.

The control unit 60 of the present embodiment is configured such that four fringe images are acquired through each of the first and second cameras 20 and 30, two pieces of phase information are acquired using typical moiré technique, a pair of corresponding points, which satisfy stereo phase conditions for making all $2\pi$ ambiguity constants as integers, is acquired using the two pieces of phase information, and the 3D shape of the object is measured.

Figure 2A:
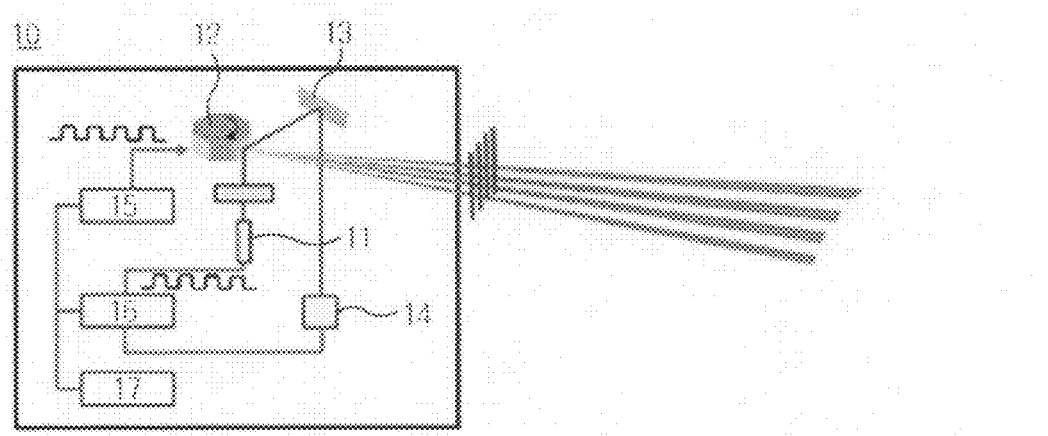
FIGS. 2A, 2B and 2C are schematic diagrams showing the various structures of a digital pattern projector according to the present invention.
Figure 2B:
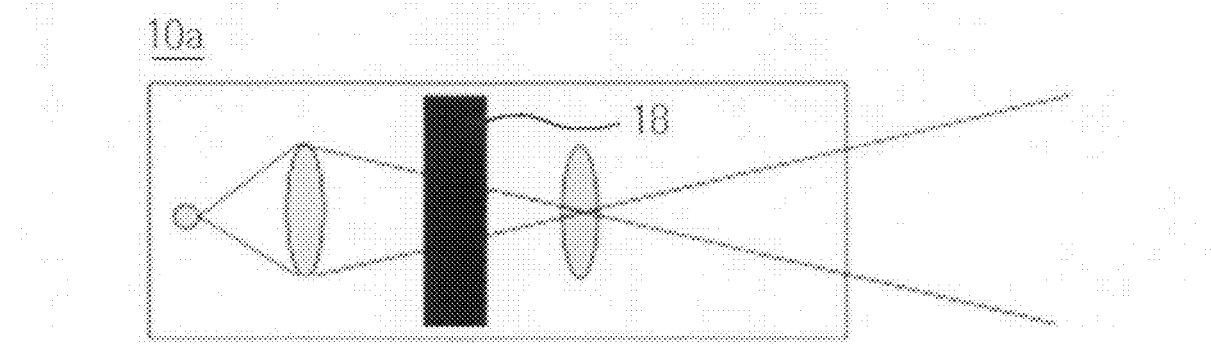
Figure 2C:
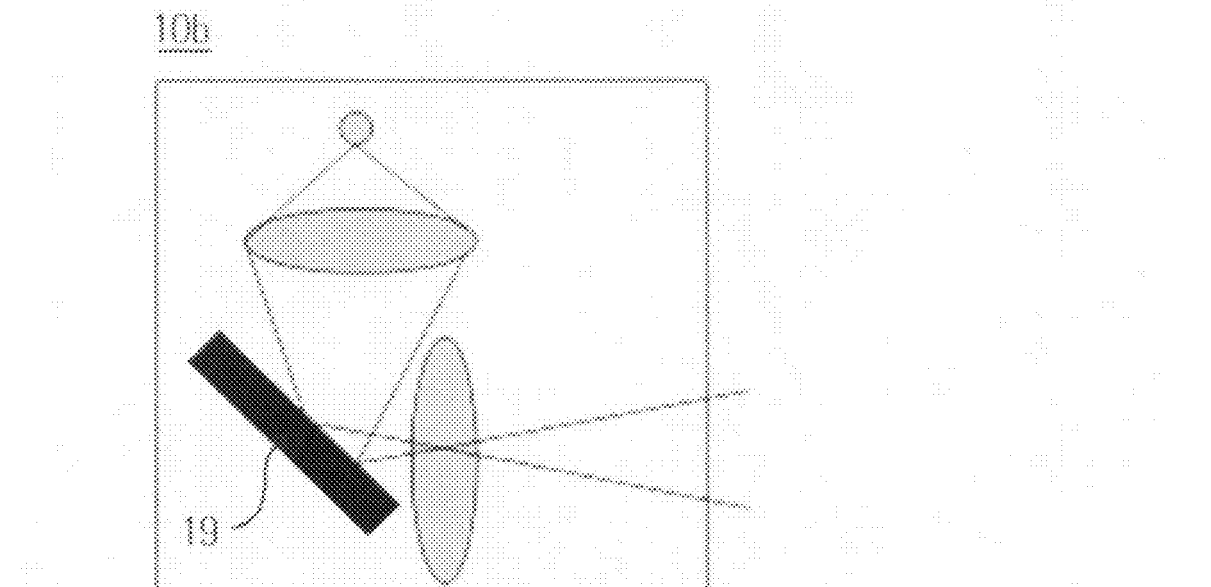

FIGS. 2A, 2B and 2C are schematic diagrams showing the various structures of the digital pattern projector according to the present invention. As shown in FIG. 2A, a digital pattern projector 10 includes a light source 11 installed in the digital pattern projector 10 and configured to project slit light, a rotating polygonal mirror 12 for reflecting the light, projected by the light source 11, in a direction toward the surface of the object 40 to be measured, a reflecting mirror 13 for reflecting part of the light, reflected by the rotating polygonal mirror 12, in another direction, and an optical detector 14 for measuring the magnitude of the light incident from the reflecting mirror 13. Furthermore, this embodiment is configured such that feedback information about the light detected by the optical detector 14 of the digital pattern projector 10 is transferred to the control unit 60.

That is, with regard to the digital pattern projector 10, while the rotating speed of the rotating polygonal mirror 12 and the On/Off timing of the light source 11 are adjusted based on the feedback information according to a program input to the control unit 60, the pattern period of light projected toward the surface of the object 40 to be measured is adjusted. Accordingly, timers 15, 16, and 17, which operate in conjunction with the rotating polygonal mirror 12 and the light source 11, are installed in the digital pattern projector 10 and control the rotating speed of the rotating polygonal mirror 12 and the On/Off timing of the light source 11.

The digital pattern projector 10a or 10b of the present embodiment may be configured using a spatial optical modulator 18, as shown in FIG. 2B, or using a micromirror 19, as shown in FIG. 2C. These digital pattern projectors 10, 10a and 10b can not only diversify a periodic pattern, but also freely perform phase shifting.

Furthermore, when the above-described digital pattern projectors 10, 10a and 10b are used, a sinusoidal fringe pattern, expressed as Equation 1, can be created on the surface of the object 40 to be measured.

$$I(x,y)=I_{bias}(x,y)+I_{mod}(x,y)\cos[2\pi f_0 x+\Phi(x,y)] \quad (1)$$

where, $I_{bias}$ is a value obtained by multiplying the sum of the light power of a pattern projector and the background light by the surface reflectance of an object to be measured, and $I_{mod}$ indicates the light power of a fringe pattern, which is determined by multiplying the light power of a pattern projector by the surface reflectance of the object to be measured. $2\pi f_0 x$ indicates the phase information of a periodic pattern on a reference surface 50. $\Phi$ indicates phase shift caused by the object to be measured. Accordingly, when information about $\Phi$ is obtained from Equation 1, information about the height of the object to be measured can be obtained. A well-known method for obtaining the height information of an object to be measured is the PMP technique.

Since the number of unknown values $I_{bias}$, $I_{mod}$, and $\Phi$ is three in Equation 1, at least three Equations are required. Accordingly, when a known phase value $2\pi n/N$ is shifted in Equation 1 and an equation is expressed in terms of n, the following Equation 2 is obtained:

$$I_n(x,y)=I_{bias}(x,y)+I_{mod}(x,y)\cos[2\pi f_0 x+\Phi(x,y)+2\pi n/N] \quad (2)$$

Furthermore, the following phase Equation (Equation 3) can be obtained using Equation 2.

$$2\pi f_0 x + \Phi(x, y) = \tan^{-1} \frac{\sum_{n=1}^{N} I_n(x, y)\sin(2n\pi/N)}{\sum_{n=1}^{N} I_n(x, y)\cos(2n\pi/N)} \quad (3)$$

When the phase information $2\pi f_0 x$ of the reference surface 50 has been already known in Equation 3, the information of $\Phi$ can be finally obtained by subtracting the phase information from Equation 3. Furthermore, an average image can be obtained using the following Equation 4.

$$I_{bais}(x, y) = \frac{1}{N} \sum_{n=1}^{N} I_n(x, y) \quad (4)$$

Figure 3B:
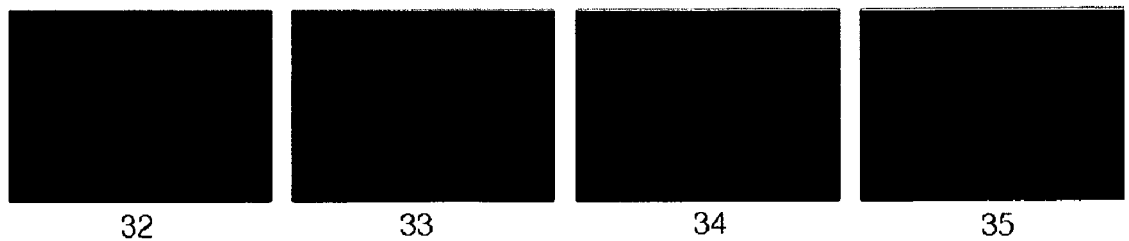

FIGS. 3A, 3B and 3C are drawings showing the states in which typical PMP technique according to the present invention is applied. FIG. 3A shows an object to be measured, and the portion indicated by the dotted line in FIG. 3A is used for measurement. FIG. 3B shows four phase-shifted fringe patterns for the application of typical PMP technique, and shows pattern images 32 to 35, which are obtained by four shifting a known phase by 0, $\pi/2$, $\pi$ and $3\pi/2$. FIG. 3C represents phase information, obtained using the fringe pattern of FIG. 3B, as an image 37. In FIG. 3C, bright portions represent $\pi$, while dark portions represent $-\pi$.

Figure 5:
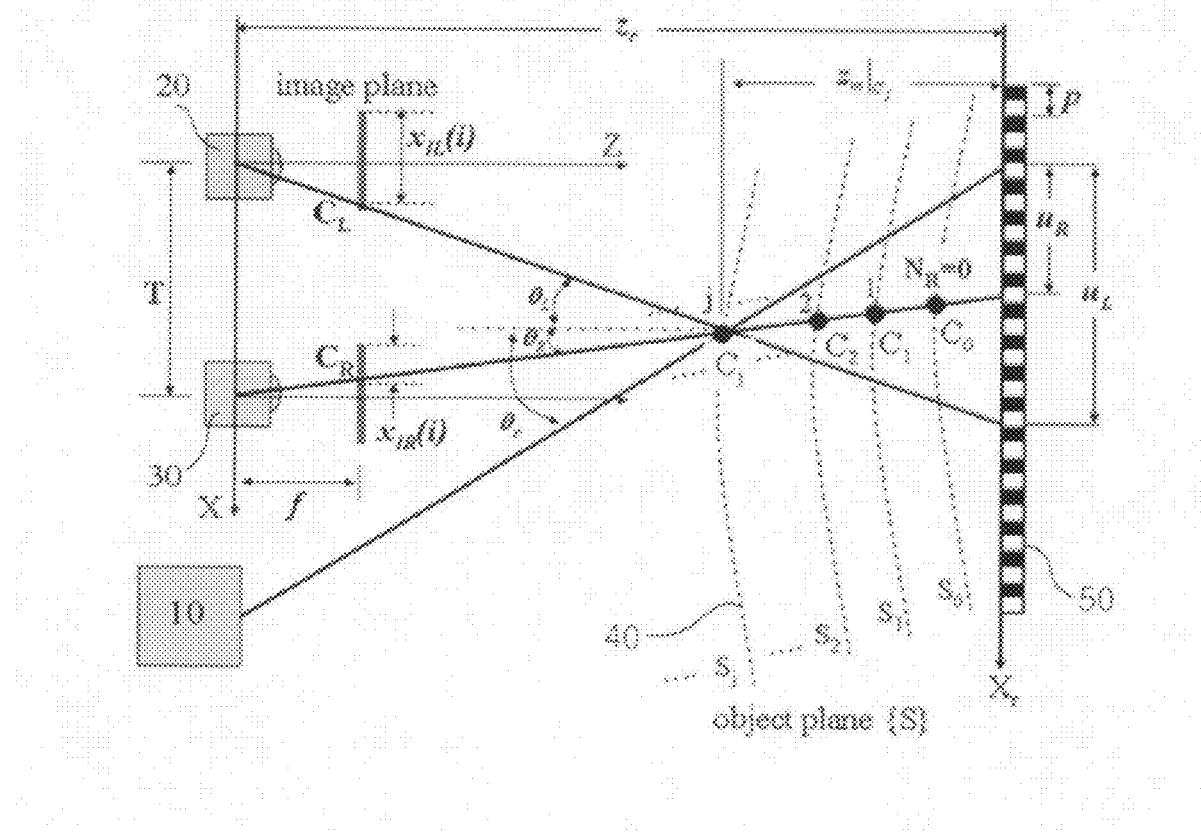
FIG. 5 is a conceptual diagram showing a method for implementing the stereo moiré technique according to the present invention.

FIG. 4 is a conceptual diagram of a stereo moiré technique 65 according to the present invention, and FIG. 5 is a conceptual diagram showing a method for implementing the stereo moiré technique according to the present invention.

As shown in FIGS. 1, and 3 to 5, four phase-shifted pattern images 22 to 25 or 32 to 35 are acquired from each of the first and second cameras 20 and 30. Thereafter, a phase information images 27 or 37 are acquired from the four phase-shifted pattern images. In summary, the present invention can acquire final 3D information using two phase information images 27 and 37.

The following Equation 5 can be obtained from FIG. 5.

$$z_m = \frac{p(2\pi N_L + \phi_L)}{2\pi(\tan\theta_L + \tan\theta_p)} = \frac{p(2\pi N_R + \phi_R)}{2\pi(\tan\theta_R + \tan\theta_p)} \quad (5)$$

In Equation 5, $z_m$ is depth information that is obtained using the moiré measurement method. Here, $z_m$ can be calculated to be $z_{mL}$ and $z_{mR}$ using first and second cameras 20 and 30 respectively. However, the value $z_{mL}$ and $z_{mR}$ must have the same value because that values are indicated the same point on the object to be measured. p indicates the period of a fringe pattern, and $\phi_L$ and $\phi_R$ indicate minimum phase values ($-\pi \sim \pi$), which are obtained by applying typical PMP technique to the information of the first and second camera 20 and 30. $N_L$ and $N_R$ indicate $2\pi$ ambiguity constants in the first and second cameras 20 and 30 respectively. $\theta_L$ indicates an angle between a light beam extending from a point $C_j$ of the object 40 to be measured to the center of the first camera 20 and the z axis of a world coordinate system, $\theta_R$ indicates an angle between a light beam extending from a point $C_j$ of the object 40 to be measured to the center of the second camera 30 and the z axis of a world coordinate system, and $\theta_P$ indicates an angle between a light beam extending from a point $C_j$ of the object 40 to be measured to the center of the digital pattern projector 10 and the z axis of a world coordinate system. T of FIG. 5 indicates a distance between the first and second cameras 20 and 30.

After two phase information images 27 and 37 have been acquired, as described above, one arbitrary point is selected from the right phase information image 37 of FIG. 4, which is acquired from the second camera 30. Furthermore, candidate points having $2\pi$ ambiguity in the existing typical PMP technique are found, a value $\phi_L(x_{IL}(i))$ is obtained by projecting these candidate points onto the phase information image of the first camera 20, and the following $N_L$ is obtained using the value.

$$N_L = \left[ \left\{ 2\pi N_R + \phi_R(x_{IR}(i)) \frac{\tan\theta_1 + \tan\theta_p}{\tan\theta_2 + \tan\theta_p} \right\} - \phi_L(x_{IL}(i)) \right] / 2\pi \quad (6)$$

That is, when $N_L$ is obtained for all the candidate points and $N_L$ close to a constant is found, final depth information can be obtained by using Equation (5) and obtained $N_L$ value.

In the following description, the results of experiments conducted on various objects to be measured using the above-described stereo moiré technique according to the present invention and the conventional moiré technique will be described below.

These experiments used a measurement apparatus that includes one digital pattern projector 10 and first and second cameras 20 and 30, as shown in FIG. 1. In this measurement apparatus, the thickness of the pattern of the reference surface 50 is 13 mm, the distance between the reference surface 50 and the first camera 20 is 681.9 mm, the distance between the first and second cameras 20 and 30 is 13 mm, and the distance between the first camera 20 and the pattern projector 10 is 95.3 mm in the negative x-axis direction and 247.1 mm in the positive z-axis direction. Thereafter, the validity of the present invention was verified through the following three experiments.

Figure 6A:
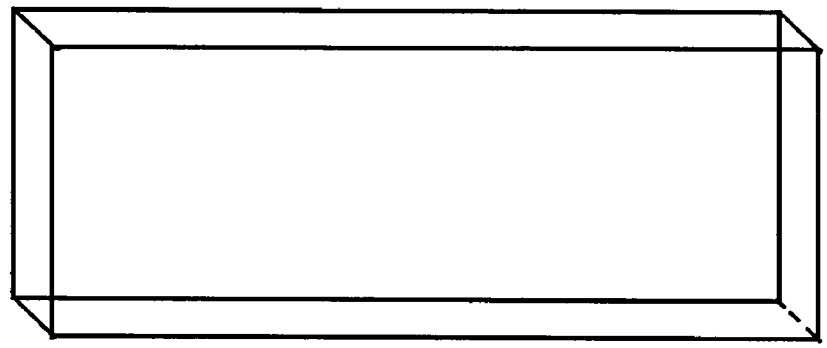
FIGS. 6A, 6B and 6C are photos of various objects to be measured, which are used to conduct experiments on the 3D shape measurement apparatus using the stereo moiré technique according to the present invention.
Figure 6B:
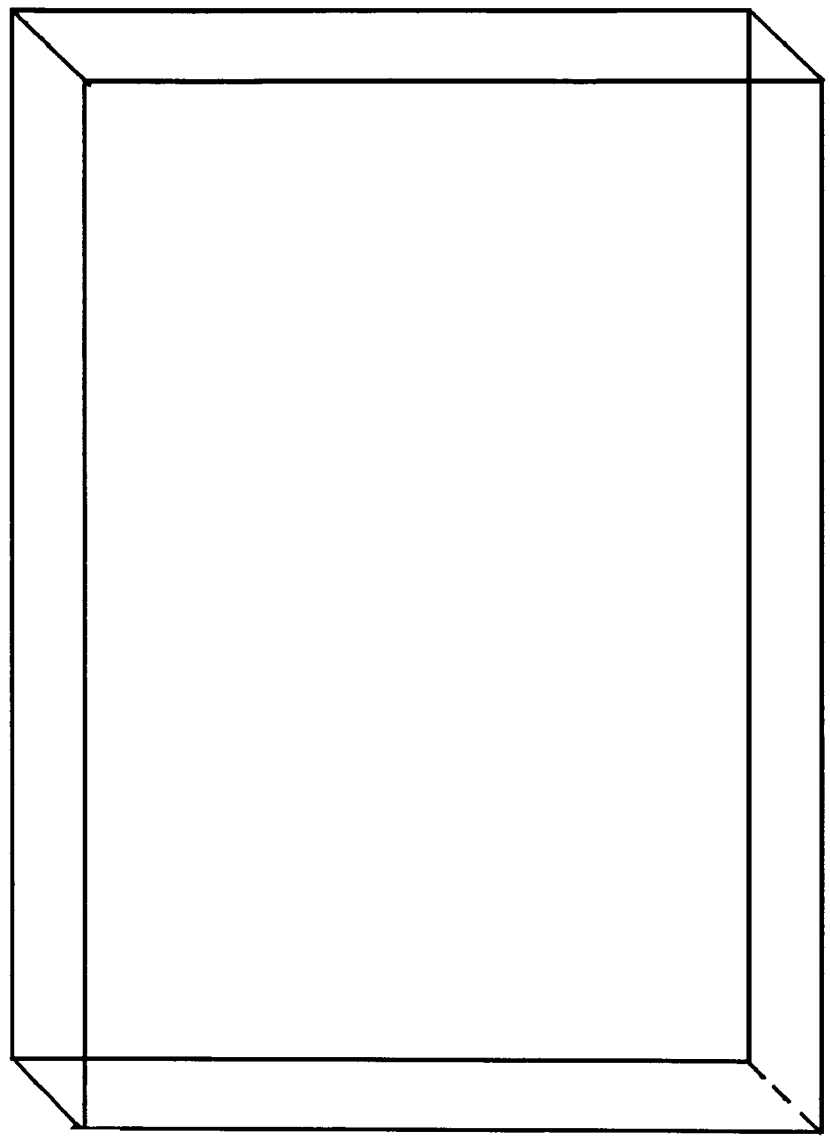
Figure 6C:
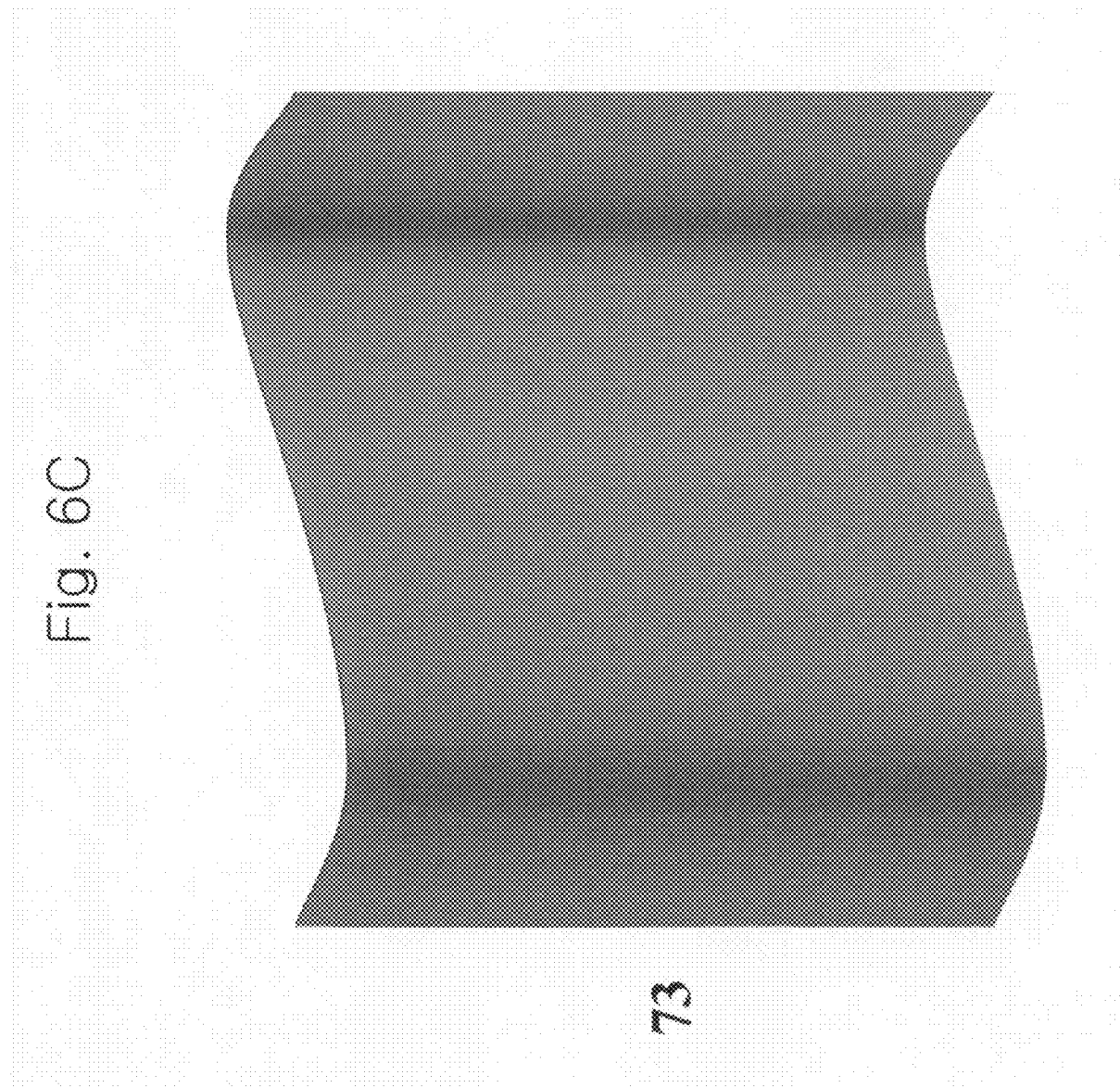

FIGS. 6A, 6B and 6C are photos of various objects to be measured, which are used to conduct experiments on the 3D shape measurement apparatus using the stereo moiré technique according to the present invention. FIGS. 7A to 9 are views showing the results of experiments on the objects of FIGS. 6A, 6B and 6C using the stereo moiré measurement method of the present invention and the conventional moiré measurement method.

Experiment 1

Using the measurement apparatus of the present invention, shown in FIG. 1, experiments were conducted in the state in which a square-shaped object 71 to be measured, having a dimension of 80×210×50 mm, as shown in FIG. 6A, was placed in front of a reference surface 50, as shown in FIG. 7A.

Figure 7B:
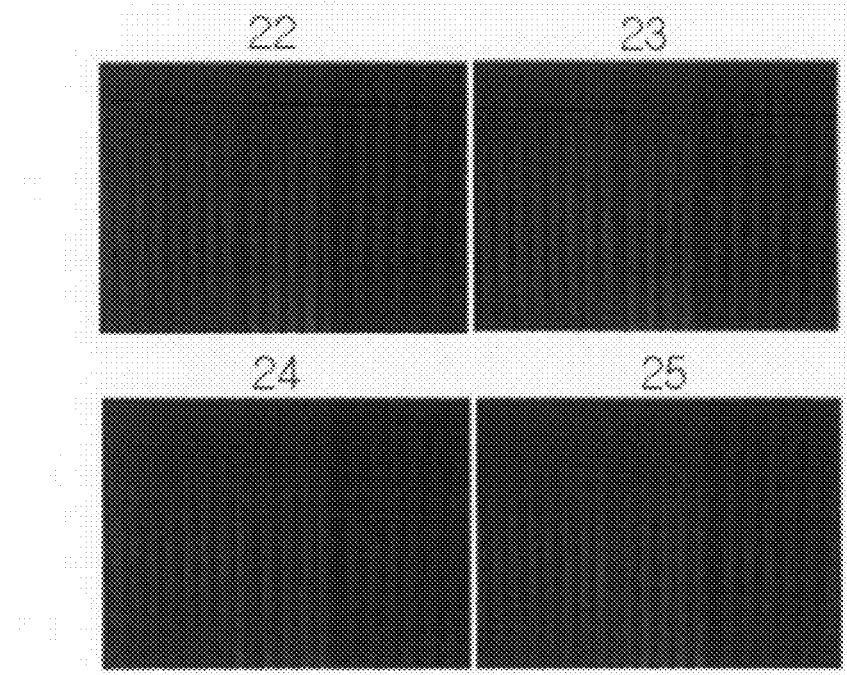
FIGS. 7A to 9D are views showing the results of experiments on the objects of FIGS. 6A, 6B and 6C using the stereo moiré measurement method of the present invention and the conventional moiré measurement method.

FIG. 7A shows the relative location of the object 71 to be measured. FIG. 7B shows pattern images 22, 23, 24 and 25 that were acquired through the first camera 20. FIG. 7C is a view showing the 3D results of experiments on the object 71 to be measured, which were obtained using the first camera 20, the pattern projector 10 and the conventional moiré technique. FIG. 7D is a view showing the 3D results of experiments on the object 71 to be measured, which were obtained using the first and second cameras 20 and 30, the pattern projector 10 and the method of the present invention.

It could be seen that highly accurate result values were obtained using both the conventional method and the method of the present invention, since the thickness of the object 71 to be measured (50 mm) was less than $2\pi$ of a pattern period, as seen from FIGS. 7C and 7D.

Experiment 2

Figure 8B:
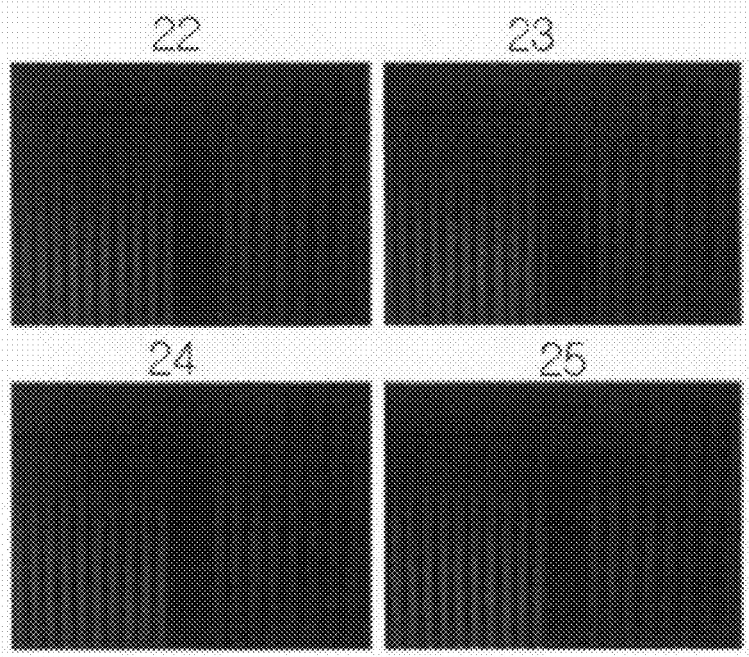

Using the measurement apparatus of the present invention shown in FIG. 1, experiments were conducted in the state in which a square-shaped object 72 to be measured, having a dimension of 222×400×80 mm, as shown in FIG. 6B, was spaced 30 mm apart from a reference surface 50, as shown in FIG. 8A. FIG. 8A shows the relative location of the object 72 to be measured. FIG. 8B shows pattern images 22, 23, 24 and 25, which were acquired through the first camera 20. FIG. 7C is a view showing the 3D results of experiments on the object 72 to be measured, which were obtained using the first camera 20, the pattern projector 10 and the conventional moiré technique. FIG. 7D is a view showing the 3D results of experiments on the object 72 to be measured, which were obtained using the first and second cameras 20 and 30, the pattern projector 10 and the method of the present invention.

It could be seen that highly accurate result values were obtained using both the conventional method and the method of the present invention, since the thickness of the object 71 to be measured (50 mm) was less than $2\pi$ of a pattern period, as seen from FIGS. 7C and 7D.

Since, in the conventional moiré technique, the object 72 to be measured was spaced 30 mm apart from the reference surface 50, and thus the surface depth of the object 72 to be measured was greater than $2\pi$ of a pattern period, the results of the experiments, different from the spatial information of the object 72, were indicated, so that an accurate depth value could not be detected, as shown in FIG. 8C. In contrast, in the method of the present invention, 3D shape information identical to actual information was generated, as shown in FIG. 8D, meaning that an accurate depth value could be acquired.

Experiment 3

Figure 9B:
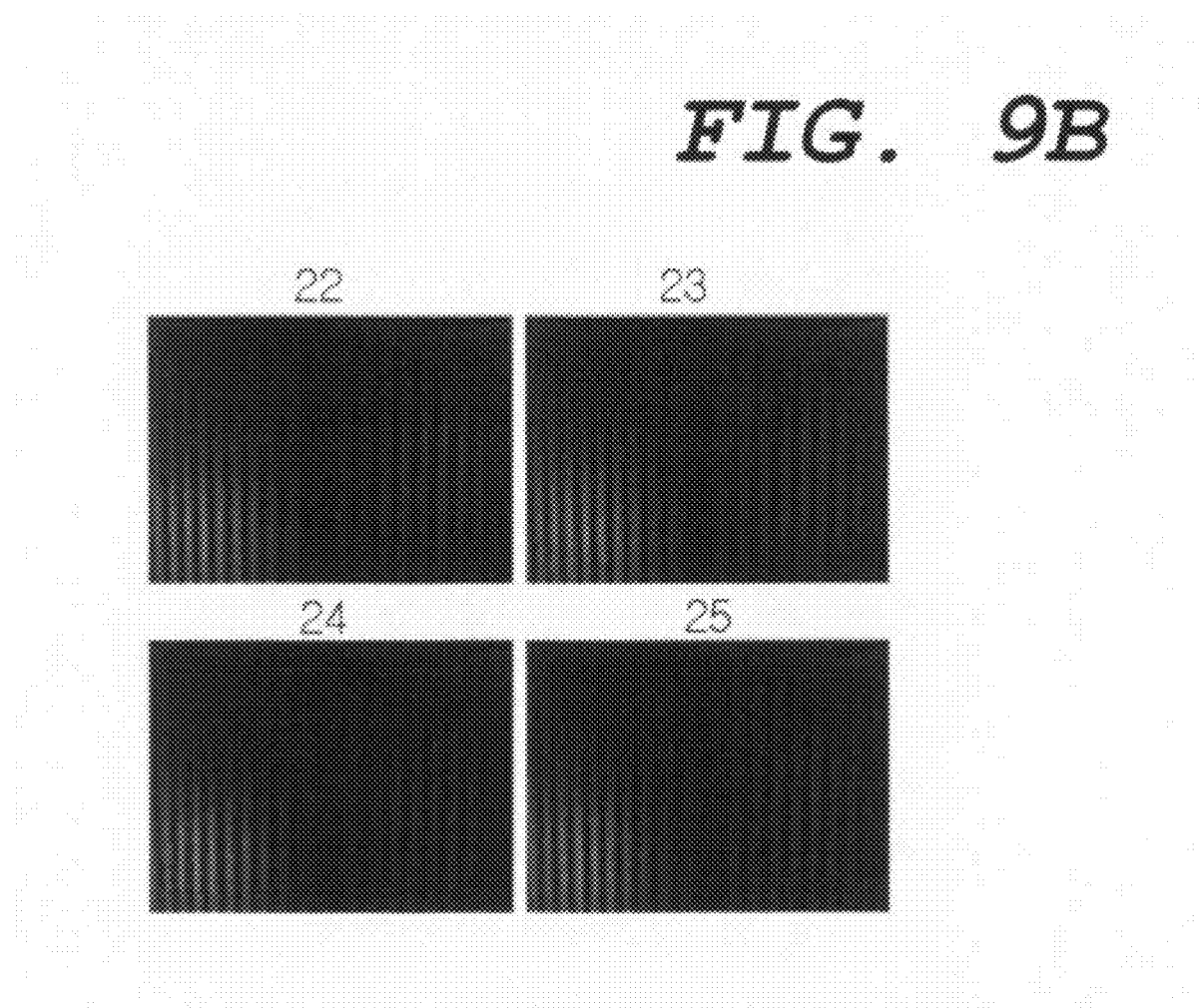

Using the measurement apparatus of the present invention shown in FIG. 1, experiments were conducted in the state in which an object 73 to be measured, to which semicircular parts having a diameter of 95 mm were attached, as shown in FIG. 6C, was disposed in front of the reference surface 50, as shown in FIG. 9A. FIG. 9A shows the relative location of the object 73 to be measured. FIG. 9B shows pattern images 22, 23, 24 and 25 that were acquired through the first camera 20. FIG. 9C is a view showing the 3D results of experiments on the object 73 to be measured, which were obtained using the first camera 20, the pattern projector 10 and the conventional moiré technique. FIG. 9D is a view showing the 3D results of experiments on the object 73 to be measured, which were obtained using the first and second cameras 20 and 30, the pattern projector 10 and the method of the present invention.

In the conventional moiré technique, it can be seen that accurate results could not be obtained, as shown in FIG. 9C. These results mean that the shape of an object can be found using a wrapping method, but it is impossible to detect the accurate location of the object. In contrast, in the method of the present invention, an accurate 3D location could be extracted, as shown in FIG. 9D. Accordingly, from the results of the present invention, it can be seen that the $2\pi$ ambiguity of the moiré technique was overcome.

The present invention can overcome the $2\pi$ ambiguity problems, which is the problem with the conventional moiré technique used for 3D measurement, by fusing a stereo vision technique, using two cameras, into the existing PMP and applying a stereo phase analysis method.

Furthermore, according to the present invention, in various environments, particularly in the case of an object having a cut end, like a square object, not only can 3D information be acquired, but rapid and accurate 3D measurement can also be performed.

Furthermore, since the present invention employs a typical digital pattern projector, which uses any type of general light source, including natural light, rather than specific light sources, measurement can be performed in various environments.

Although the 3D shape measurement apparatus and method using the stereo moiré technique have been described above in conjunction with the accompanying drawings, this description illustrates the preferred embodiments of the present invention as examples, but is not intended to limit the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-dimensional (3D) shape measurement method using a stereo moiré technique, the method measuring a 3D shape of an object to be measured using a digital pattern projector and first and second cameras, the method comprising:

a first step of projecting a phase-shifted fringe pattern onto the object to be measured using the digital pattern projector;

a second step of acquiring four fringe images using each of the first and second cameras, and then acquiring two pieces of phase information using a moiré technique; and a third step of acquiring a pair of corresponding points, which satisfy stereo phase conditions for making all $2\pi$ ambiguity constants as integers, using the two pieces of phase information and then measuring the 3D shape of the object using the corresponding points.

2. The 3D shape measurement method as set forth in claim 1, wherein, at the first step, the digital pattern projector projects periodic pattern, a location and angle of which has been calibrated, onto the object to be measured.

3. The 3D shape measurement method as set forth in claim 1, wherein the third step comprises the steps of:

selecting candidate points having $2\pi$ ambiguity using the phase information acquired through the second camera; and projecting the candidate points onto the phase information image of the first camera, and selecting a point, which satisfies stereo phase conditions for making all $2\pi$ ambiguity constants as integers.

4. A 3D shape measurement apparatus using a stereo moiré technique, the apparatus comprising a digital pattern projector for projecting a periodic pattern, first and second cameras for each detecting a fringe pattern produced by the light projected by the digital pattern projector, and a control unit for controlling operation of the digital pattern projector and the first and second cameras, wherein the control unit is configured such that four fringe images are acquired through each of the first and second cameras, two pieces of phase information are acquired using the moiré technique, a pair of corresponding points, which satisfy stereo phase conditions for turning all $2\pi$ ambiguity constants into integers, is acquired using the two pieces of phase information, and a 3D shape of the object is measured using the corresponding points.

5. The 3D shape measurement apparatus as set forth in claim 4, wherein the digital pattern projector projects natural light, a location and angle of which has been calibrated, onto the object to be measured.

* * * * *